(12) United States Patent
Wang et al.

(10) Patent No.: US 10,904,122 B2
(45) Date of Patent: Jan. 26, 2021

(54) FACILITATING WORKLOAD-AWARE SHUFFLING AND MANAGEMENT OF MESSAGE TYPES IN MESSAGE QUEUES IN AN ON-DEMAND SERVICES ENVIRONMENT

(71) Applicant: salesforce.com, inc., San Francisco, CA (US)

(72) Inventors: Xiaodan Wang, Dublin, CA (US); Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 988 days.

(21) Appl. No.: 14/526,135

(22) Filed: Oct. 28, 2014

(65) Prior Publication Data
US 2016/0119244 A1    Apr. 28, 2016

(51) Int. Cl.
*H04L 12/863* (2013.01)
*H04L 12/927* (2013.01)
*H04L 12/26* (2006.01)
*H04L 12/24* (2006.01)

(52) U.S. Cl.
CPC ...... *H04L 43/0876* (2013.01); *H04L 43/0817* (2013.01); *H04L 41/5051* (2013.01)

(58) Field of Classification Search
CPC ..... H04L 47/50; H04L 43/0876; H04L 47/80; H04L 43/0817; H04L 41/5051; H04L 12/863; H04L 12/927; H04L 12/26; H04L 29/08144; H04L 29/06; H04L 29/08072; H04L 29/08171; H04L 12/5695; H04L 12/24

USPC ............. 709/226; 340/16.1; 713/36; 711/150
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Tonia L Dollinger
*Assistant Examiner* — Mehulkumar J Shah
(74) *Attorney, Agent, or Firm* — Jaffery Watson Mendonsa & Hamilton LLP

(57) ABSTRACT

In accordance with embodiments, there are provided mechanisms and methods for facilitating dynamic workload-aware shuffling of message types in message queues in an on-demand services environment in a multi-tenant environment according to one embodiment. In one embodiment and by way of example, a method includes monitoring, in runtime, workload patterns associated with incoming workloads, where each workload is associated with a plurality of message types and the plurality of message types are inspected and processed in a predetermined order. The method may further include collecting, in runtime, information regarding each message type based on a workload pattern of its associated workload, and dynamically shuffling the order based on the information, where shuffling includes ordering a first set of message types having one or more messages ahead of a second set of message types having fewer or no messages.

6 Claims, 7 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,820,042 B1 * | 11/2004 | Cohen ................ H04L 41/145 |
| | | 702/179 |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,983,299 B1 * | 7/2011 | Ma .......................... H04L 47/52 |
| | | 370/229 |
| 9,271,326 B2 * | 2/2016 | Kotecha ................ H04W 76/38 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0152305 A1 * | 10/2002 | Jackson ................ H04L 41/509 |
| | | 709/224 |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0016685 A1 * | 1/2003 | Berggreen .......... H04L 47/6285 |
| | | 370/412 |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0146711 A1 * | 7/2006 | Anbarani ............ H04L 12/5602 |
| | | 370/235 |
| 2009/0138828 A1 * | 5/2009 | Schultz .................. G06Q 10/10 |
| | | 715/853 |
| 2009/0177744 A1 | 7/2009 | Marlow et al. |
| 2009/0271662 A1 * | 10/2009 | Tarta .................... G06F 11/3672 |
| | | 714/37 |
| 2010/0125565 A1 * | 5/2010 | Burger .............. G06F 16/24524 |
| | | 707/713 |
| 2010/0333099 A1 * | 12/2010 | Kupferschmidt ....... G06F 9/546 |
| | | 718/103 |
| 2011/0029657 A1 * | 2/2011 | Gueta ................... H04L 43/026 |
| | | 709/224 |
| 2011/0142064 A1 * | 6/2011 | Dubal ................... H04L 47/122 |
| | | 370/412 |
| 2011/0191463 A1 * | 8/2011 | Liu ........................ G06F 15/16 |
| | | 709/224 |
| 2011/0216773 A1 * | 9/2011 | Vegesna ................. H04L 12/56 |
| | | 370/395.4 |
| 2012/0151063 A1 * | 6/2012 | Yang ....................... H04L 67/10 |
| | | 709/226 |
| 2013/0077486 A1 * | 3/2013 | Keith ...................... H04L 47/22 |
| | | 370/230.1 |
| 2014/0269314 A1 * | 9/2014 | Ozer ...................... H04L 47/25 |
| | | 370/235 |
| 2014/0313901 A1 * | 10/2014 | Yacovitch ............. H04W 28/12 |
| | | 370/236 |
| 2015/0131434 A1 * | 5/2015 | Lee ..................... H04L 47/2433 |
| | | 370/230 |

(56) References Cited

U.S. PATENT DOCUMENTS

| | | | | |
|---|---|---|---|---|
| 2015/0324135 A1* | 11/2015 | Chan | ................ | G06F 3/061 |
| | | | | 711/114 |
| 2015/0381511 A1* | 12/2015 | Word | ................ | H04L 47/50 |
| | | | | 709/223 |
| 2016/0094480 A1* | 3/2016 | Kulkarni | ............. | H04L 47/2441 |
| | | | | 370/230 |

* cited by examiner

FACILITATING WORKLOAD-AWARE SHUFFLING AND MANAGEMENT OF MESSAGE TYPES IN MESSAGE QUEUES IN AN ON-DEMAND SERVICES ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating dynamic workload-aware shuffling and management of message types in message queues in an on-demand services environment.

BACKGROUND

Conventional message queueing techniques consider all message types even if only some of the message types have incoming traffic and thus such techniques get progressively expensive and inefficient as they are wasteful of resources, such as power, memory, time, etc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
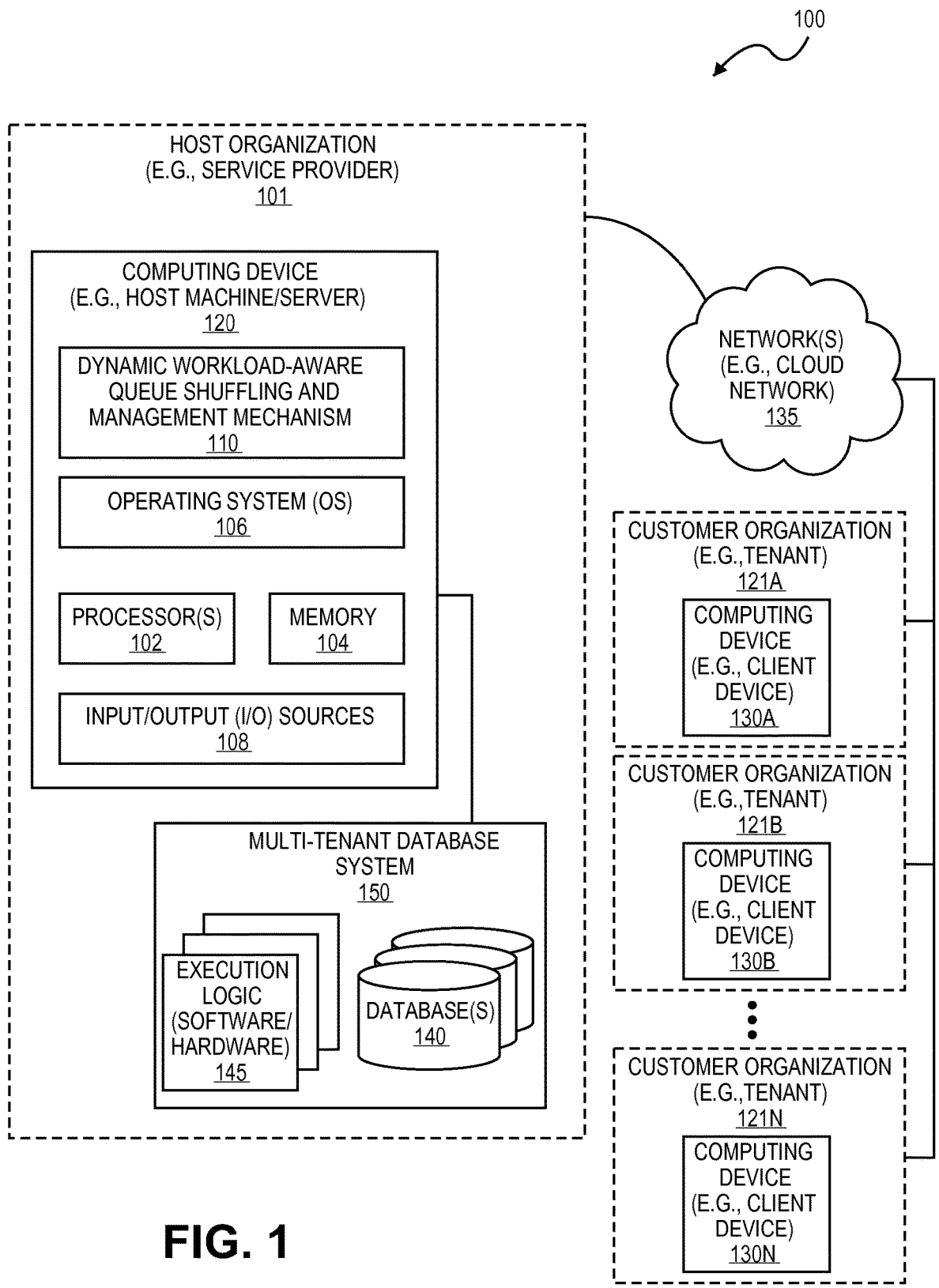
FIG. 1 illustrates a system having a computing device employing a dynamic workload-aware queue shuffling and management mechanism according to one embodiment.

In accordance with embodiments, there are provided mechanisms and methods for facilitating dynamic workload-aware shuffling of message types in message queues in an on-demand services environment in a multi-tenant environment according to one embodiment. In one embodiment and by way of example, a method includes monitoring, in runtime, workload patterns associated with incoming workloads, where each workload is associated with a plurality of message types and the plurality of message types are inspected and processed in a pre-determined order. The method may further include collecting, in runtime, information regarding each message type based on a workload pattern of its associated workload, and dynamically shuffling the order based on the information, where shuffling includes ordering a first set of message types having one or more messages ahead of a second set of message types having fewer or no messages.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic workload-aware shuffling and management of message types in message queues in an on-demand services environment in a multi-tenant environment according to one embodiment.

Embodiments provide for a technique for gathering information about incoming workloads and this workload-awareness may then be used to shuffle the order of queues in which each queue belong may belong to an exact number of message type, such as exactly one message type. For example, this knowledge or awareness regarding the message types may then be used to shuffle the order in which message type queues are inspected, such that message types with many messages may be inspected in front or ahead of message types that lack or has few messages.

As aforementioned, conventional queuing systems (e.g., Oracle® AQ) can get progressively expensive and inefficient as they process and consider all message types in a pre-determined order (e.g., the order in which the messages types are created regardless of the number of incoming messages associated with the message types). It is contemplated that a progressive increase in the number of message types will degrade performance if a few message types are responsible for a vast majority of the increased traffic in the message type queues.

Embodiments provide for obtaining and incorporating, in runtime, knowledge relating to workload access patterns relating to incoming workloads relating to message types to then be used to intelligently shuffle or re-order the message types such that certain messages types (such as those that are more likely to have messages) may be given priority so that messages belong to their queues may be inspected and processed prior to inspecting and processing other message types (such as message types with fewer or no messages). For example, this novel technique may result in significant reduction of resource consumption, such as multiple factors of reduction in memory accesses for dequeue invocations against message type queues with no messages, in database elapsed time when dequeue occurs at the front of the ordered list of message type queues inspected, etc.

Embodiments provide for: 1) leveraging workload access patterns in constructing message type queue lists; 2) dynamically and automatically adapting or modifying the constructed lists to changes in the knowledge relating to the correspondingly changing workloads over time 3) applying segmentation concepts to the ordering of lists; 4) randomizing techniques for preserving fair selection and resisting starvation; and 5) employing a comparison/measurement metric for comparing/measuring queue list efficiencies, etc.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a dynamic workload-aware queue shuffling and management mechanism 110 according to one embodiment. In one embodiment, computing device 120 includes a host server computer serving a host machine for employing dynamic queue shuffling and management mechanism ("workload-aware mechanism") 110 for facilitating dynamic shuffling of message type queues in a multi-tiered, multi-tenant, on-demand services environment.

It is to be noted that throughout this document, the term "shuffling" may be interchangeably referred to as "re-shuffling", "ordering" or "re-ordering", "organizing" or "re-organizing" of message types (also referred to as "job types") in which each message type belongs to a separate queue. Similarly, it is to be noted that message types may relate to or associated with one or more customer organizations, such as customer organizations 121A-121N, where, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc., serving as a customer or client of host organization 101 (also referred to as "service provider" or simply "host") (e.g., Salesforce®) serving as a host of workload-aware mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 100 may include (without limitation) server computers (e.g., cloud server computers, etc.), desktop computers, cluster-based computers, set-top boxes (e.g., Internet-based cable television set-top boxes, etc.), etc. Computing device 100 includes an operating system ("OS") 106 serving as an interface between one or more hardware/physical resources of computing device 100 and one or more client devices 130A-130N, etc. Computing device 100 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQyuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
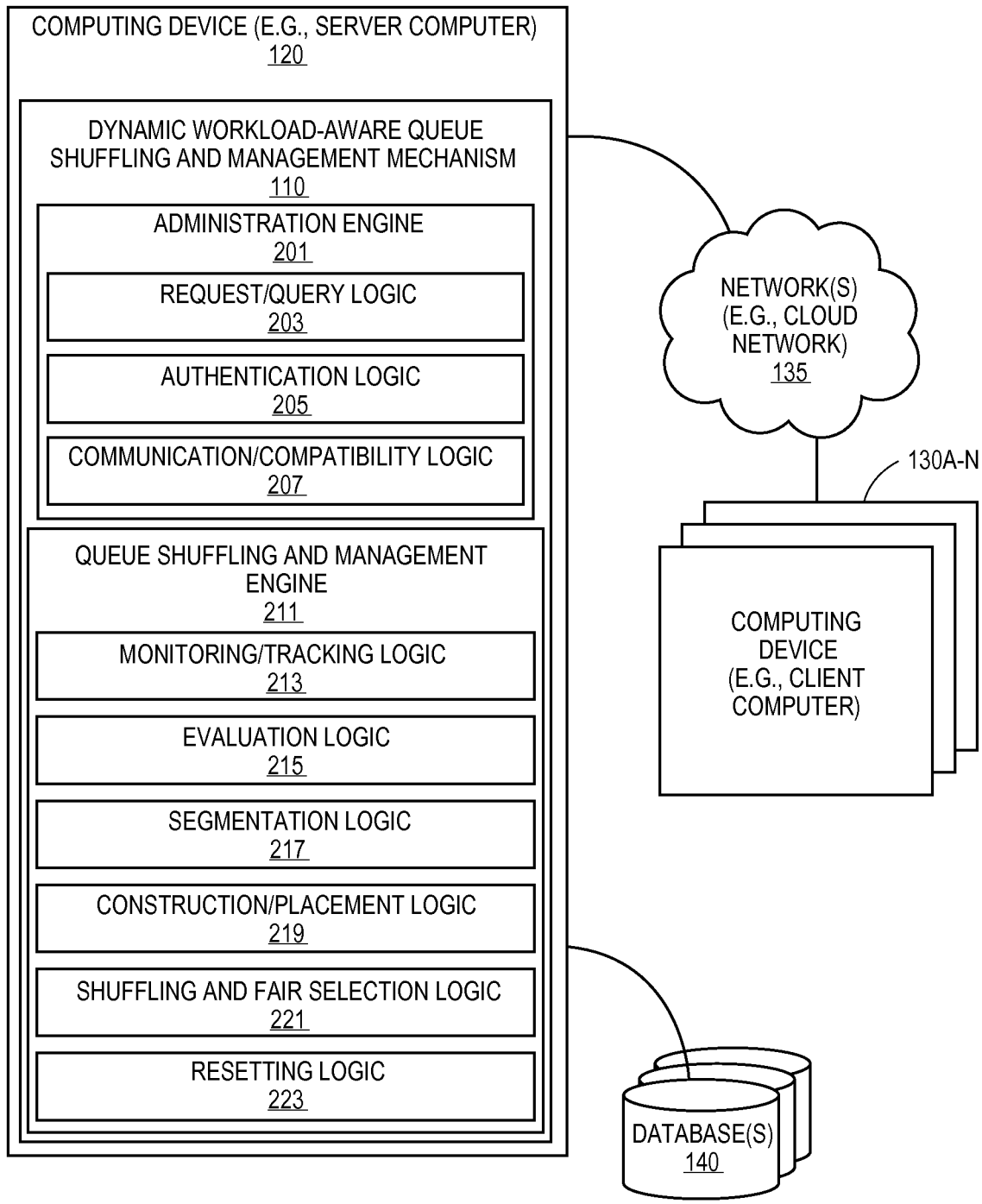
FIG. 2 illustrates a dynamic workload-aware queue shuffling and management mechanism according to one embodiment.

FIG. 2 illustrates a dynamic workload-aware queue shuffling and management mechanism 110 according to one embodiment. In one embodiment, workload-aware mechanism 110 may include a number of components, such as (without limitation and not necessarily in this order): administration engine 201 and dynamic queue shuffling and management engine ("shuffling/management engine") 211. In one embodiment, administration engine may include a number of components, such as (without limitation) request/query logic 203, authentication logic 205, and communication/compatibility logic 207. Similarly, in one embodiment, shuffling/management engine 211 may include a number of components, such as (without limitation) monitoring/tracking logic 213, evaluation logic 215, segmentation logic 217, list construction/placement logic 219, shuffling and fair selection logic 221, and resetting logic 223.

Throughout this document, terms like "logic", "component", "module", "framework", "engine", "tool", and "builder" may be referenced interchangeably and include, by way of example, software, hardware, and/or any combination of software and hardware, such as firmware. Further, any use of a particular brand, word, or term, such as "workload", "message type", "queue", "segmentation", "shuffling" or "re-shuffling", "queueing" or "re-queuing", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 100 is further shown to be in communication with any number and type of other computing devices, such as client computing devices 130A-N, over one or more networks, such as network(s) 140.

In one embodiment, monitoring/tracking logic 213 may be used to monitor and/or track messages placed in a message type's queue. For example, each message type may be associated with a customer organization and assigned a specific customer name corresponding to the customer organization. Some of the examples of message types may include (without limitation) DASHBOARD, PHYSICAL_DELETE, CHATTER_TOPICS, PARTNER_NETWORKS, SEARCH_INDEXING, APEX_FUTURE, etc. It is contemplated that embodiments are not limited to any number or type of message types; however, for the sake of brevity, clarity, and ease of understanding, the aforementioned examples of message types may be continued to be used as examples throughout the document.

In applying conventional techniques, for example, if the order of the message types is determined to be as follows: DASHBOARD, PHYSICAL_DELETE, CHATTER_TOPICS, PARTNER_NETWORKS, SEARCH_INDEXING, APEX_FUTURE, each of the message types is inspected, processed, and returned in this exact order. For example, even if only some of the message types have any incoming traffic, such as APEX_FUTURE, a conventional technique would traverse all previous five message types before getting to APEX_FUTURE and accordingly, incurring a very high database CPU cost. Similarly, for example, certain message types, such as CHATTER_TOPICS, SEARCH_INDEXING, may be known for producing much more traffic than some of the other message type and yet, using the conventional techniques, such high traffic-producing message types are equally likely to be processed near the end, causing additional burden on the system.

In one embodiment, in tracking any number and type of message types, monitoring/tracking logic 213 of shuffling/management engine 211 may simultaneously monitor and obtain or collect any amount and type of relevant knowledge or information (e.g., message types, messages or contents associated with each message type, incoming traffic associated with each message type, etc.) which may then be provided to evaluation logic 215 for further processing. Upon receiving the information, evaluation logic 215 may then be used to evaluate the collected information to determine patterns of incoming workloads associated with the tracked message types. For example, evaluation logic 215 may be used to evaluate workload patterns relating to incoming workloads associated with the message types which are then used to approximate the level of traffic associated with each message type, such as whether a message type cause high traffic, medium traffic, low traffic, or the like. For example, at each application server, a number of dequeues (each dequeue corresponds to the processing of a single message) may be tracked locally for each message type and subsequently, each message type with at least one message dequeued may be noted and the dequeue count may be correspondingly incremented.

The workload or traffic patterns as dynamically determined, in runtime, by evaluation logic 215 may then be provided to segmentation logic 217 for further processing. In one embodiment, segmentation logic 217 may use the workload patterns relating to the message types to segment the message types into two or more groups. For example, depending on the workload pattern, the amount of traffic associated with each message type may be dynamically determined by segmentation logic 217, such as (continuing with the aforementioned message types) message types like CHATTER_TOPICS and SEARCH_INDEXING may have more messages than other message types and thus contribute more incoming traffic than the other message types. In one embodiment, upon this determination of traffic level, segmentation logic 217 may assign a traffic level (e.g., high, medium, low, etc.) to each message type and the segment the message types in their appropriate groups which are then placed in a list.

For brevity and simplicity, for example, a list of merely two groups, such as high and low, top and bottom, etc., may be created and the message types may be divided into the two groups, accordingly, based on the level of traffic associated with each of them; for example, a high traffic group of message types, a low traffic group of message types, etc. It is contemplated that the high traffic group message types occupy the highest amount or percentage of dequeue traffic while in contrast, the low traffic group message types occupy the lowest amount or percentage of dequeue traffic. It is further contemplated that the list may be dynamically created and maintained, in runtime, as the occupant of its groups may move about from one group to another group depending on the changes in the traffic patterns of the workloads.

In one embodiment, using segmentation logic 217, an amount and/or percentage represented by configurable components, such as probability K, probability M, etc., may be assigned to one or more groups, such as top-K high traffic group, bottom-M low traffic group, etc., respectively, where the K group represents or includes a set of high traffic message types (e.g., CHATTER_TOPICS, SEARCH_INDEXING etc.) that capture 90% of incoming traffic, while the M group represents or includes the rest of the message types (e.g., DASHBOARD, PHYSICAL_DELETE, PARTNER_NETWORKS, APEX_FUTURE, etc.) that capture the remaining 10% of the incoming traffic.

In one embodiment, using segmentation logic 217, merely one amount/percentage and its configurable component, such as K, may be predetermined to select a group of top or high traffic message types, while the rest of the message types may be segmented and put into another group representing low traffic message types. As provided in the example above, the value of K may be selected to be a percentage, such as 90%; however, it is contemplated that the value of K may be determined and selected based on one or more factors, such as a K that is too low may excessively favor a few message types while starving the remaining message types, a K that is too high may position the high traffic message types too far back in the ordered list providing minimal savings of dequeue costs, etc.

Similarly, in some embodiments, if many message types are determined by evaluation logic 215 and segmentation logic 217 to have none or zero traffic associated with them, then such zero-traffic message types may be segmented into the low traffic group and types are randomly selected from the low traffic group to fill the ranks of the top K message types. It is contemplated this set of randomly selected message types may change between dequeue operations so as to give the remaining, zero-traffic message types, an equal chance at being ordered at the front of the list. This is further to ensure that the random selection of low traffic message types to fill the ranks of top-K message types is fair across all such message types.

In one embodiment, once the message types are segmented into groups by segmentation logic 217, this segmentation information or groups may then be forwarded on to construction/placement logic 219 where an ordered list (also referred to as "order list" or simply "list") of message types is generated based on their assigned groups. For example, in one embodiment, a list of message types may be constructed by construction/placement logic 219 such that the top-K high traffic message types are placed, via construction/placement logic 219, in or near front in the order of message types in the list, while any remaining message types are placed, via construction/placement logic 219, in or near end in the order of message types in the list.

In one embodiment, upon creating the list and having placed the message types in it in accordance with the amount of incoming traffic for each message type, as facilitated by construction/placement logic 219, the order of the message types even within each group is then shuffled by shuffling and fair selection logic 221 to ensure that even though, for example, top-K high traffic message types may be placed in the front of the list, their order within the top-K group is not deterministic. This way, for example, a fair selection of the message types, such as top-K message types, within each group, such as top-K group, is maintained so that each message type is granted an equal chance of being placed at a location, such as in the front, of the list within the group. Further, this fair selection prevents a handful of message types from monopolizing the message queue thread resources and in the process, avoids any danger of starving off other message types in the top-K group.

In some embodiments, to preserve fair selection, shuffling and fair selection logic 221 may determine, at a given probability (e.g., 50-50 or 50%), whether any of the top-K message types are ignored in favor of a completely random ordering of the list. For example, the probability may be configured and predetermined by shuffling and fair selection logic 221 according to traffic patterns as monitored and evaluated by monitoring/tracking logic 213 and evaluation logic 215, respectively. For example, if K equals 50 and the top 50 message types account for 90% of overall queue traffic, then the top-K message types may be ordered and placed at the front of the list 90% of the time, while the remaining 10% of the time the list is constructed by permuting all message types (both low and high traffic) at random while ignoring dequeue traffic for the top-K message types as facilitated by shuffling and fair selection logic 221. This way, low traffic message types are given a 10% chance (in accordance with their traffic) of being ordered in front of top-K message types across various application servers. This prevents the top-K high traffic message types from monopolizing the message queue thread resources and in the process, avoids any danger of starving off low traffic message types (such as due to continuous traffic from top-K message types).

Further, continuing with this example, since top 50 message types may usually account for more than 90% of the traffic in the queue, for example, a conservative 90/10 split may be applied by shuffling and fair selection logic 221. Now, for example, using this split a roughly 45% reduction in database CPU may be expected and achieved. It is contemplated that embodiments are not limited to any of the aforementioned numbers or values.

In some embodiments, the dequeue traffic may be adjusted or reset, via resetting logic 223, upon reaching a pre-determined period of time (e.g., one hour, etc.) such that the order of the list may adapt to any changes in the traffic patterns of the message types over time (the ranks of the top-K message types may shift significantly over time). However, any previously-acquired knowledge relating to the top-K message types may be preserved and, in one embodiment, the dequeue traffic for top-K message types is seeded with non-zero, but relatively low, values after the reset. This technique may help avoid any dequeue cost spikes and other sudden performance degradations at the boundaries of the predetermined time period (e.g., each hour, etc.) by continuing to order top-K message types at the front of the list in the absence of dequeue traffic at the start of the predetermined time period (e.g., at the start of the hour, etc.).

In another embodiment, a seed value of 100 representing, for example, a median number of messages or message types being processed and observed in a given time period, such as an hour, may be used such that any message types exceeding the median traffic volume may rise to the ranks of top-K message types in the subsequent time period, such as the next hour.

In one embodiment, any number and type of interfaces may be provided to facilitate various tasks performed via various components of workload-aware mechanism 110. For example and in one embodiment, one or more tasks facilitated by monitoring/tracking logic 213 may be performed via one or more interfaces, such as SmartTracker, etc., and similarly, any increments to allow dequeue threads to update counts on each successful dequeue operation may be performed via one or more interfaces, such as IncrementDequeueCountforType, etc., and so forth.

Communication/compatibility logic 207 may facilitate the ability to dynamically communicate and stay configured with any number and type of software/application developing tools, models, data processing servers, database platforms and architectures, programming languages and their corresponding platforms, etc. Communication/compatibility logic 207 further facilitates the ability to dynamically communicate and stay configured with various computing devices (e.g., server computing device, mobile computing devices, such as smartphones, tablet computers, laptop, etc.), databases, repositories, networks (e.g., cloud network, intranet, the Internet, proximity network, such as Bluetooth®, WiFi®, etc.), websites (e.g., social/business networking websites, such as Chatter®, Facebook®, LinkedIn®, Google+®, Twitter®, etc.), etc., while ensuring compatibility with changing technologies, parameters, protocols, standards, etc.

It is contemplated that any number and type of components may be added to and/or removed from workload-aware mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
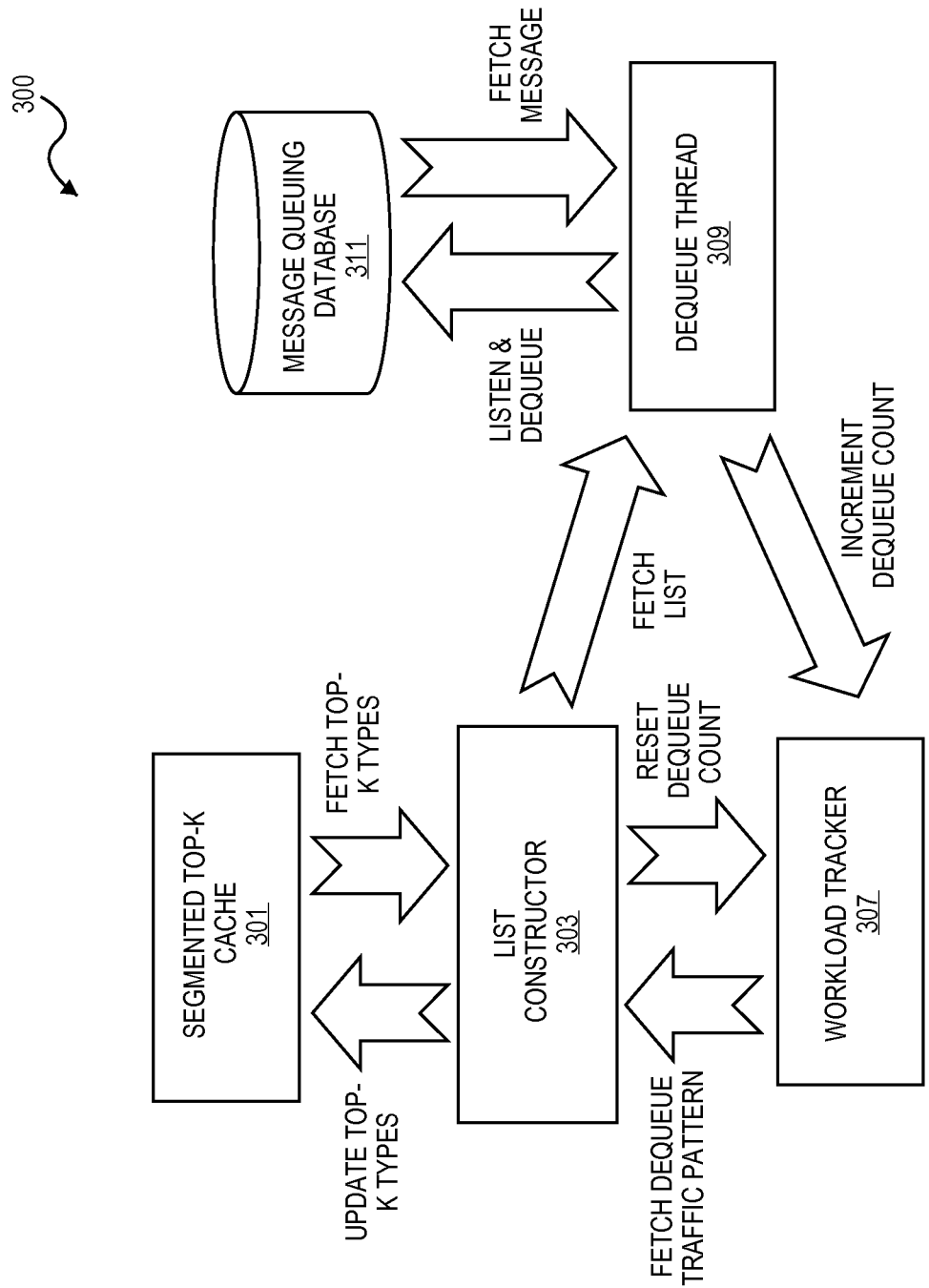
FIG. 3 illustrates a transaction sequence for facilitating dynamic workload-aware shuffling and management of message types in message queues according to one embodiment.

FIG. 3 illustrates a transaction sequence 300 for facilitating dynamic workload-aware shuffling and management of message types in message queues according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by workload-aware mechanism 110 of FIGS. 1-2. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

In one embodiment, transaction sequence 300 is shown to employ one or more components, such as message queueing database 311 (also referred to as "message oriented middleware") may be one of databases 140 of FIG. 1, such as a data structure being used as a repository for queueing of message types. In one embodiment, transaction sequence 300 is further shown to employ segmented top-K cache 301 having, for example, top-K high traffic message types which may be communicated between top-K cache 301 and list constructor 303 for construction of the ordered list of message types as facilitated by construction/placement logic 219.

In the illustrated embodiment, messages are fetched from message queuing database 311 to dequeue thread 309 which then communicates an increment dequeue count to workload tracker 307 which may be the same as or as facilitated by monitoring/tracking logic 203. In one embodiment, workload tracker 307 generates and then fetches, at runtime, dequeue traffic patterns associated with incoming workloads to listen list constructor 303 which may be the same as or as facilitated by construction/placement logic 219. Listen list constructor 303 constructs and continuously updates, at runtime, a list of message types, such as update top-K message types, to segmented top-K cache 301.

At segmented top-K cache 301, in one embodiment, a variety of segmented top-K message types may be stored or placed which are then fetched to listen list constructor 303 which may then communicate a reset dequeue count to workload tracker 307. Similarly, listen lists are fetched from listen list constructor 303 to dequeue thread 309 and then, ordered listen list of message types and dequeue are communicated from dequeue thread 309 to message queuing database 311.

Figure 4:
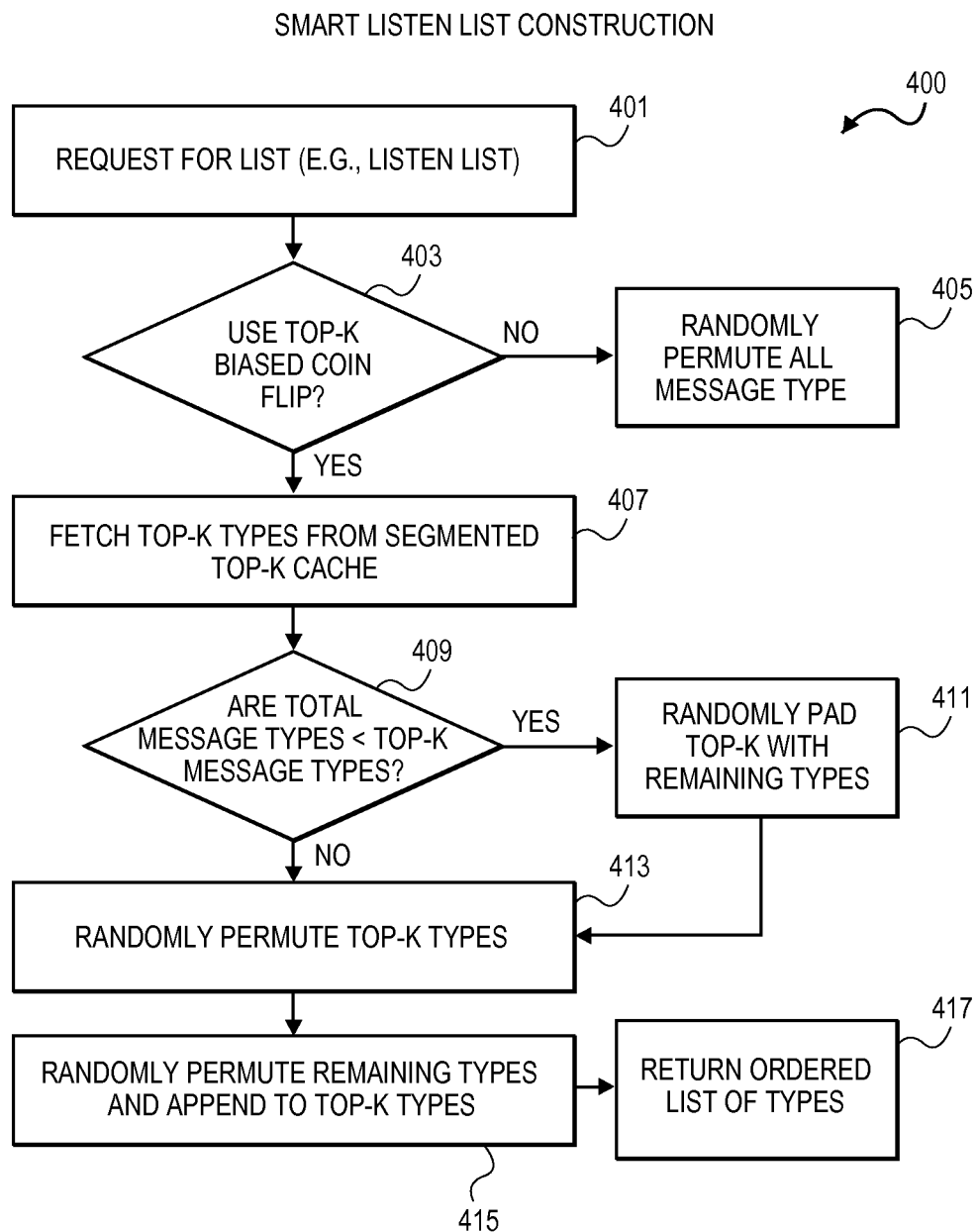
FIG. 4 illustrates a method for facilitating dynamic workload-aware shuffling and management of message types in message queues according to one embodiment.

FIG. 4 illustrates a method 400 for facilitating dynamic workload-aware shuffling and management of message types in message queues according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by workload-aware mechanism 110 of FIGS. 1-2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 400 begins at block 401 with receiving a request for listen list at block 401. At block 403, a determination is made as to whether one or more probability techniques (e.g., top-K bias coin flip) may be used for top-K message types. As aforementioned, one embodiment, top-K bias coin flip chooses at random either top-K message type selection at block 407 or permuting all message types randomly at block 405. If, however, block 407 is used, top-K message types are fetched from segmented top-K cache, such as segmented top-K cache 301 of FIG. 3.

At block 409, in one embodiment, another determination is made as to whether the number of top-K message types is less than K. If yes, at block 411, the top-K group is randomly padded with types from the remaining low traffic message types. Then, and if there are K message types in the top-K group, at block 413, the top-K message types are randomly permuted. At block 415, the remaining message types are randomly permuted and then appended to the top-K message types at the end of the list. At block 417, an ordered list of message types is returned which may then be used and duplicated to be used in one or more message queues.

Figure 5:
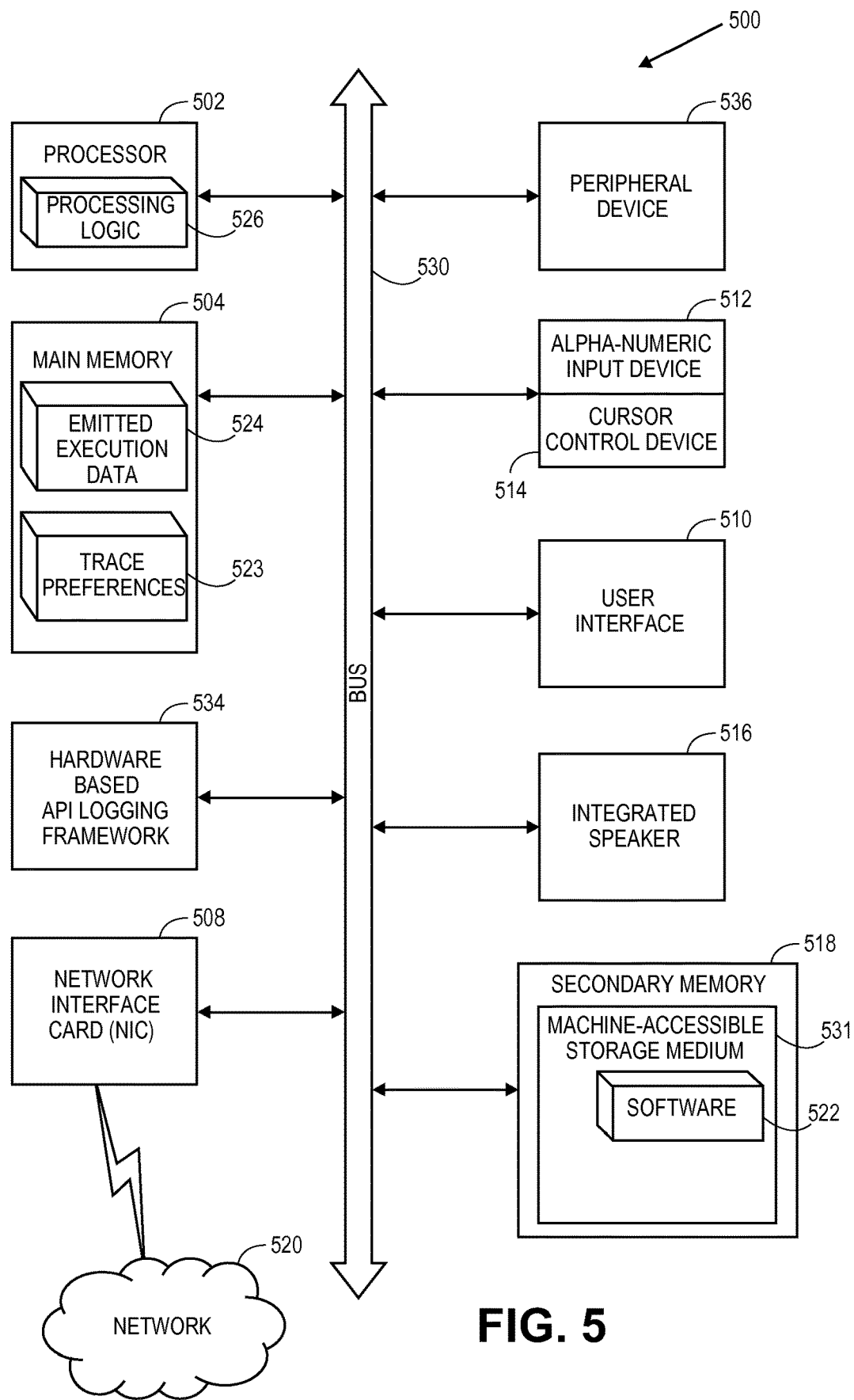
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic workload-aware queue shuffling and management mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic workload-aware queue shuffling and management mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
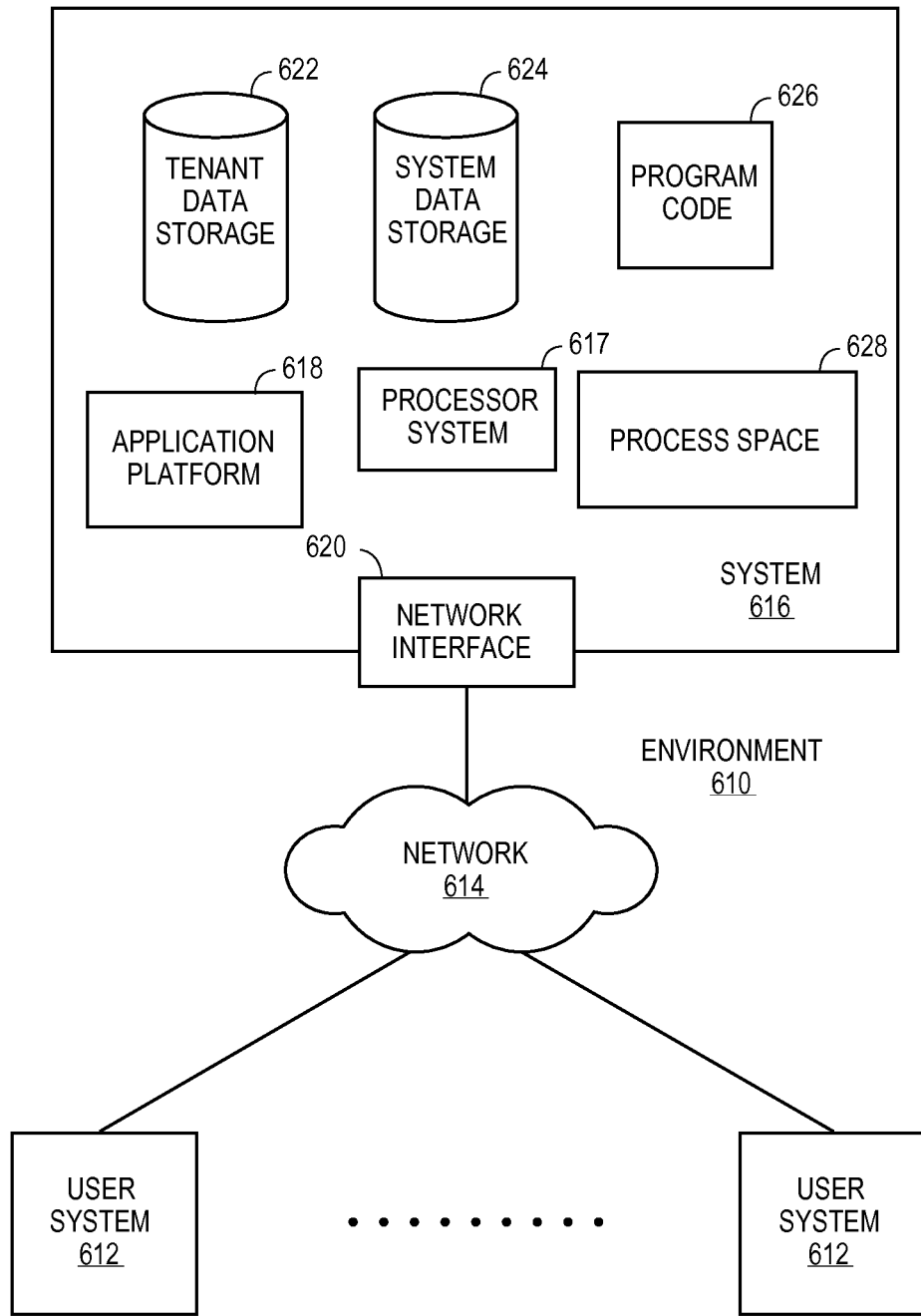
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
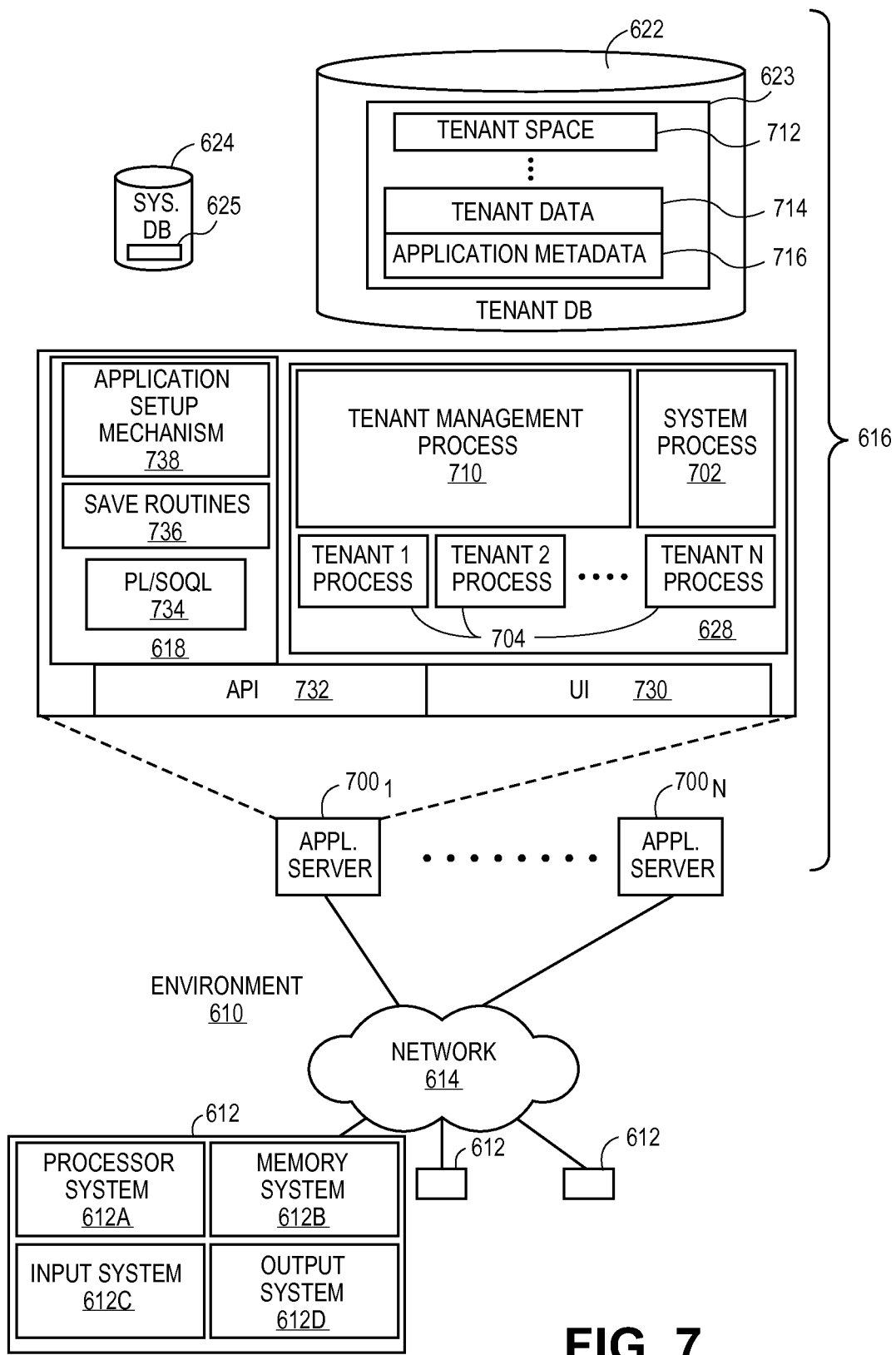
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700$_1$-700$_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method facilitated by a workload server computing device ("workload device") for managing traffic at processing queues for tenants in a multi-tenant database environment, the method comprising:
   monitoring, by the workload device, workload patterns associated with incoming workloads having messages associated with the tenants, the workload patterns indicating processing times relating to message types associated with the messages;
   assigning, by the workload device, traffic levels to the message types based on the processing times as indicated by the workload patterns such that a traffic level is associated with each message type, wherein a high traffic level is associated with a first message type for consuming high processing time in processing queues, a medium traffic level is associated with a second message type for consuming medium processing time in the processing queues, and a low traffic level is associated with a third message type for consuming a low processing time in the processing queues;
   grouping, by the workload device, the message types based on the traffic levels for placement of the messages in the processing queues;
   constructing, based on the grouping, a list of workload sets having at least one of a first set of high-traffic workloads associated with first messages corresponding to the high traffic level and the first message type, a second set of medium-traffic workloads associated with second messages corresponding to the medium traffic level and the second message type, and a third set of low-traffic workloads associated with third messages corresponding to the low traffic level and the third message type, wherein the first messages are placed on top to be processed first in the processing queues, while the third messages are placed at bottom to be processed last in the processing queues, wherein the placement corresponds to an order in which the messages are dequeued and processed from the processing queues based on the traffic levels; and
   runtime shuffling, by the workload device, of the messages between the processing queues based on runtime changes to assignments of the traffic levels to the message types.

2. The method of claim 1, further comprising automatically resetting placement of the messages over predetermined periods of time or upon occurrence of one or more events.

3. A database system comprising:
   a workload server computing device ("workload device") for managing traffic at processing queues for tenants in a multi-tenant database environment, the workload device having a processing device coupled with a memory device, the processing device to facilitate operations comprising:
   monitoring, by the workload device, workload patterns associated with incoming workloads having messages associated with the tenants, the workload patterns indicating processing times relating to message types associated with the messages;
   assigning, by the workload device, traffic levels to the message types based on the processing times as indicated by the workload patterns such that a traffic level is associated with each message type, wherein a high traffic level is associated with a first message type for consuming high processing time in processing queues, a medium traffic level is associated with a second message type for consuming medium processing time in the processing queues, and a low traffic level is associated with a third message type for consuming a low processing time in the processing queues;
   grouping, by the workload device, the message types based on the traffic levels for placement of the messages in the processing queues;
   constructing, based on the grouping, a list of workload sets having at least one of a first set of high-traffic workloads associated with first messages corresponding to the high traffic level and the first message type, a second set of medium-traffic workloads associated with second messages corresponding to the medium traffic level and the second message type, and a third set of low-traffic workloads associated with third messages corresponding to the low traffic level and the third message type, wherein the first messages are placed on top to be processed first in the processing queues, while the third messages are placed at bottom to be processed last in the processing queues, wherein the placement corresponds to an order in which the messages are dequeued and processed from the processing queues based on the traffic levels; and runtime shuffling, by the workload device, of the messages between the processing queues based on runtime changes to assignments of the traffic levels to the message types.

4. The database system of claim 3, wherein the operations further comprise automatically resetting placement of the messages over predetermined periods of time or upon occurrence of one or more events.

5. A non-transitory computer-readable medium having stored thereon instructions which, when executed by a computing device having a workload server computing device for managing traffic at processing queues for tenants, cause the computing device to facilitate operations comprising:

monitoring, by the workload device, workload patterns associated with incoming workloads having messages associated with the tenants, the workload patterns indicating processing times relating to message types associated with the messages;

assigning, by the workload device, traffic levels to the message types based on the processing times as indicated by the workload patterns such that a traffic level is associated with each message type, wherein a high traffic level is associated with a first message type for consuming high processing time in processing queues, a medium traffic level is associated with a second message type for consuming medium processing time in the processing queues, and a low traffic level is associated with a third message type for consuming a low processing time in the processing queues;

grouping, by the workload device, the message types based on the traffic levels for placement of the messages in the processing queues;

constructing, based on the grouping, a list of workload sets having at least one of a first set of high-traffic workloads associated with first messages corresponding to the high traffic level and the first message type, a second set of medium-traffic workloads associated with second messages corresponding to the medium traffic level and the second message type, and a third set of low-traffic workloads associated with third messages corresponding to the low traffic level and the third message type, wherein the first messages are placed on top to be processed first in the processing queues, while the third messages are placed at bottom to be processed last in the processing queues, wherein the placement corresponds to an order in which the messages are dequeued and processed from the processing queues based on the traffic levels; and runtime shuffling, by the workload device, of the messages between the processing queues based on runtime changes to assignments of the traffic levels to the message types.

6. The non-transitory computer-readable medium of claim 5, wherein the operations further comprise automatically resetting placement of the messages over predetermined periods of time or upon occurrence of one or more events.

* * * * *